United States Patent [19]

Hutton

[11] 4,207,919

[45] * Jun. 17, 1980

[54] DIGITAL FLUID FLOW CONTROL SYSTEM

[75] Inventor: Roger S. Hutton, Minneapolis, Minn.

[73] Assignee: Powell Industries, Inc., Salt Lake City, Utah

[ * ] Notice: The portion of the term of this patent subsequent to Feb. 10, 1993, has been disclaimed.

[21] Appl. No.: 942,327

[22] Filed: Sep. 14, 1978

Related U.S. Application Data

[63] Continuation of Ser. No. 614,843, Sep. 19, 1975, which is a continuation of Ser. No. 64,142, Aug. 3, 1970, Pat. No. 3,937,248, which is a continuation of Ser. No. 703,468, Feb. 6, 1968, abandoned.

[51] Int. Cl.² ............................................. G05D 7/03
[52] U.S. Cl. .................................. 137/487.5; 137/599
[58] Field of Search ........................... 137/487.5, 599; 251/129

[56] References Cited

U.S. PATENT DOCUMENTS

| | | |
|---|---|---|
| 1,436,417 | 11/1922 | Trumble . |
| 1,757,059 | 5/1930 | Rickenberg . |
| 2,002,761 | 5/1935 | Armstrong . |
| 2,504,428 | 4/1950 | Kimball .................. 251/139 |
| 2,627,280 | 2/1953 | Adelson . |
| 2,999,482 | 9/1961 | Bower . |
| 3,072,146 | 1/1963 | Gizeski ..................... 137/599 X |
| 3,308,619 | 3/1967 | Richardson et al. . |
| 3,331,393 | 7/1967 | Ernyei . |
| 3,502,105 | 3/1970 | Ernyei et al. . |

FOREIGN PATENT DOCUMENTS 1186275  2/1959  France .

Primary Examiner—Robert G. Nilson
Attorney, Agent, or Firm—Christie, Parker & Hale

[57] ABSTRACT

An upstream fluid chamber adapted for fluid flow in a given direction is interconnected to a downstream fluid chamber by a plurality of individually actuatable digital valve elements disposed in a plane substantially transverse to the given direction so that the pressure drop across each valve element is substantially the same. The valve elements are disposed so the fluid from the upstream chamber passing through the valve elements converges in the downstream chamber to dissipate the vena contracta. The areas of the valve elements are weighted so the smaller areas follow a geometric progression while the larger areas deviate from a geometric progression. Preferably, at least the two larger areas are the same size. The valve elements themselves each have an orifice, a plug, and means for maintaining the plug in one of two positions. The plug seals the orifice in the one position and lies outside of the fluid stream in the static fluid region in the other position.

1 Claim, 9 Drawing Figures

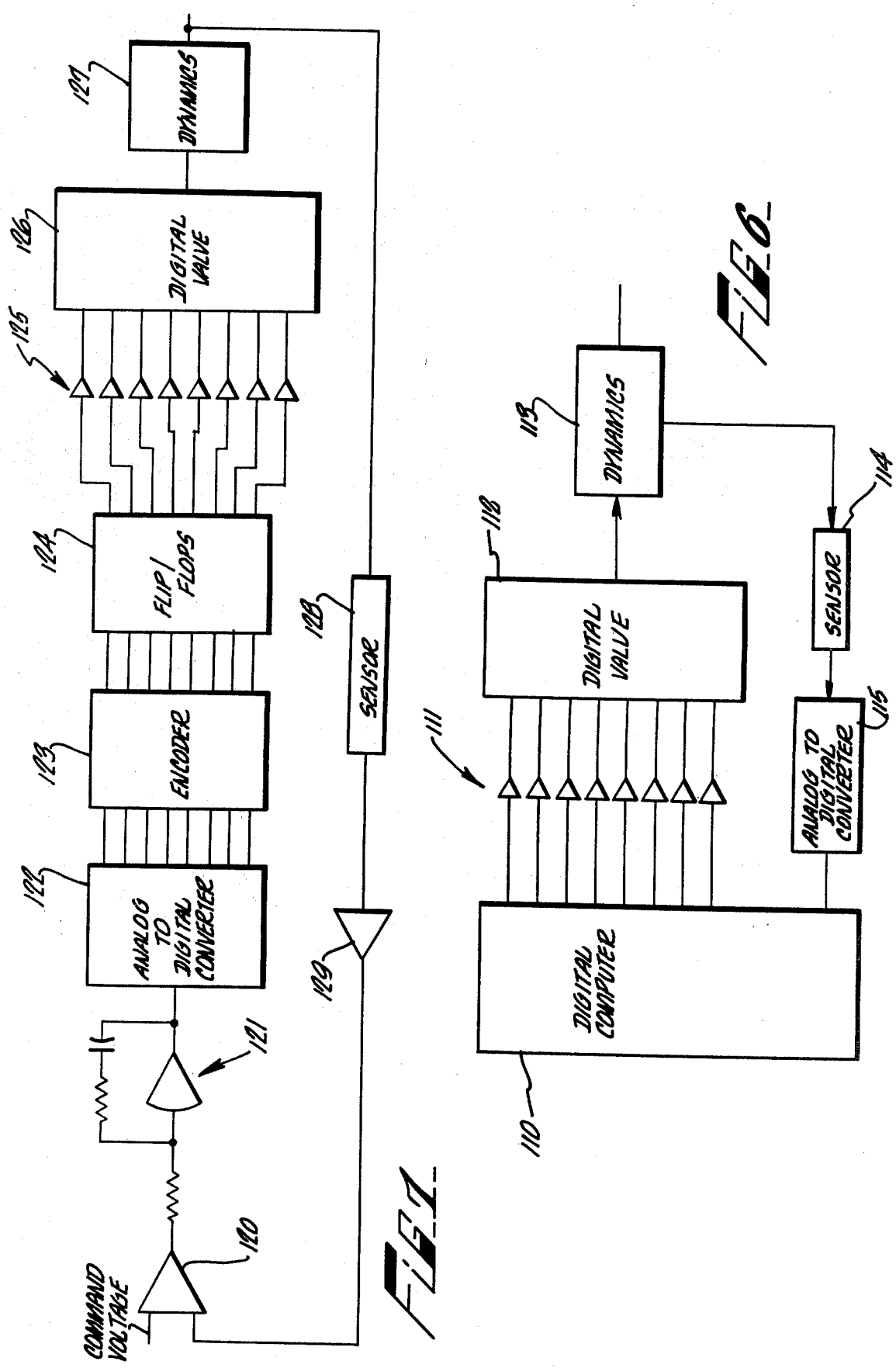

DIGITAL FLUID FLOW CONTROL SYSTEM

This is a continuation of application of, now U.S. Pat. No. 3,937,248 Ser. No. 614,843, filed Sept. 19, 1975, which is a continuation of application Ser. No. 64,142, filed on Aug. 3, 1970, which is a continuation of application Ser. No. 703,468, filed on Feb. 6, 1968, now abandoned.

BACKGROUND OF THE INVENTION

This invention relates to the control of fluid flow and, more particularly, to a digital fluid flow control system.

Conventionally, a single element analog valve is employed to control the rate of flow in a fluid system. The essential components of such a valve are an orifice through which the fluid flows and a plug that is movable into and out of the orifice. The flow rate through the valve is determined by the extent that the plug blocks the orifice. There are also fluid control systems in the prior art that utilize multiple valve elements. They are, for the most part, digital flow control devices comprising a plurality of digital valve elements capable of assuming one of two stable states—open or closed. Generally, the orifice areas are weighted to follow a geometric progression of two.

Schmohl et al. U.S. Pat. No. 2,229,903, issued Jan. 28, 1941, discloses a digital valve in which two parallel laterally displaced conduits are connected by a plurality of cross ports distributed at different points along the length of the conduits. These cross ports have orifices with different areas and individually actuatable plugs blocking the orifices. It is taught that the orifices are selectively unblocked either individually or in combinations to control the rate of flow through the valve. In this way, many more different flow rates can be established by the valve than there are individual orifices.

Dufour U.S. Pat. No. 3,063,468, issued Nov. 13, 1962, discloses a plurality of valve elements stacked adjacent to one another along the direction of fluid flow. The valve elements take the form of discs that are individually rotatable into either of two positions. Apertures are arranged on the discs so that a different number of apertures of the discs are aligned for each combination of disc positions. The number of aligned apertures follows a geometric progression of two as successive discs are rotated. Fluid flows through the aligned apertures. Thus, the more apertures that are aligned, the more fluid flows through the system.

U.S. Pat. No. 3,072,146, issued Jan. 8, 1963, to T. Gizeski, is directed to a digital regulator valve in which transverse inlet and outlet manifolds are linked at different points along their lengths by conduits having digital control valves with orifice areas following a geometric progression of two. An upstream conduit feeds the inlet manifold, and the outlet manifold supplies a downstream conduit. A digital programmer controls the operation of the digital valve elements and therefore the rate of fluid flow through the system.

Ernyei U.S. Pat. No. 3,331,393, issued July 18, 1967, discloses a fluid flow control system employing balanced digital valve elements. The upstream conduit of the fluid system is connected to a first disc-shaped cavity and the downstream conduit of the fluid system is connected to second and third disc-shaped cavities located on either side of the first cavity. Each digital valve element cuts through the three cavities at a different point, having an orifice between the first cavity and the second cavity and an orifice between the first cavity and the third cavity. Two plugs mounted on the same rod control the fluid flow through the orifices of each valve element. The force exerted on one of the plugs due to the pressure drop across its orifice is balanced by the force exerted on the other plug due to the pressure drop across its orifice.

The prior art fluid flow control systems employing multiple digital valve elements suffer numerous shortcomings that are especially serious at high pressures and fluid flow rates. First, the valve elements are distributed along the direction of fluid flow in the system. As a result, the pressure drops across the valve elements differ from one another and are dependent on the states of the other valve elements. Correspondingly, the flow rates through the valve elements are also interdependent, i.e., not solely a function of the orifice areas. In a digital fluid flow control system this interdependence is manifested as a deviation in the flow rate from the nominal digital values.

Second, the problem of the formation of a vena contracta by the fluid passing through the digital valve elements is not met. At high flow rates, the vena contracta causes the effective orifice area of the valve element to become pressure dependent, thereby introducing a source of unlinearity into the fluid control system. In addition, the vena contracta frequently triggers cavitation, which causes pitting of the valve parts and inefficient operation.

Third, the valve elements of a digital fluid flow control system invariably have orifice areas that are weighted to follow a geometric progression of two. Accordingly, one-half of the maximum flow rate through the fluid flow control system is attributable to only one valve element. Full advantage is not then taken of the potential simplifications in valve design made possible by the fact the fluid is handled by a plurality of valve elements rather than a single element in an analog valve. Further, each time the most significant valve element is opened or closed, an extraordinary disturbance may be created in the fluid system because of the possible differences in opening and closing time of the different elements.

Fourth, it is difficult to design the digital valve elements themselves so the fluid rate in the open state remains constant in the course of prolonged use. Each valve element comprises a flow determining orifice and a plug that assumes one of two stable positions. When the valve element is open, the plug is positioned to seal the orifice. When the valve element is closed, the plug is positioned in the fluid stream in spaced relationship from the orifice so the orifice is unblocked. In the open state of the valve element, the extent to which the orifice is unblocked depends upon the position of the plug since the plug is in the fluid stream. As the moving parts of the valve element wear with prolonged use, the position of the plug in the fluid stream in the open state varies, and the flow rate varies accordingly. In other words, the plug tends to modulate the flow rate in the same manner as an analog valve.

SUMMARY OF THE INVENTION

The invention contemplates a digital fluid flow control system having an upstream conduit, a downstream conduit, and a plurality of individually actuatable digital valve elements interconnecting the upstream conduit and the downstream conduit. Each valve element has a flow determining orifice, a plug, and means responsive to a binary signal for controlling the movement of the plug so it assumes one of only two stable positions corresponding to the values of the binary signal; the plug closes the orifice in the one stable position and lies outside the fluid stream in the other stable position. A signal is generated representative of the dynamic fluid conditions of the system. A plurality of binary signals equal to the number of valve elements are produced. The binary signals represent the valve states required to make the dynamic fluid conditions satisfy a predetermined criterion. The signal representative of the dynamic fluid conditions is coupled to the circuitry for producing the binary signals and the binary signals are coupled to the respective valve elememts to place their plugs in the positions corresponding to the values of the binary signals. As a result, small changes in the position of the plugs that develop in the course of prolonged use do not affect the fluid flow rate through the open valve elements. Improved repeatability of the flow control system ensues. The features of the invention can be used to advantage in automatic fluid control systems. In an analog control system, an analog-to-digital converter is employed to furnish the signals for driving a signal valve from an analog error signal. In automatic control systems having a digital computer that determines the fluid flow rate, the output of the computer can be coupled to the valve system without intervention of an analog-to-digital converter.

BRIEF DESCRIPTION OF THE DRAWINGS

The features of specific embodiments of the invention are illustrated in the drawings, in which:

FIG. 3 is a perspective view partially in section of a modification of the embodiment of FIG. 2;

FIG. 6 is a block schematic diagram of a digital valve in an automatic fluid control system employing a digital computer to determine the flow rate; and FIG. 7 is a block schematic diagram of a digital valve in an automatic analog fluid control system.

DESCRIPTION OF SPECIFIC EMBODIMENTS

Figure 1A:
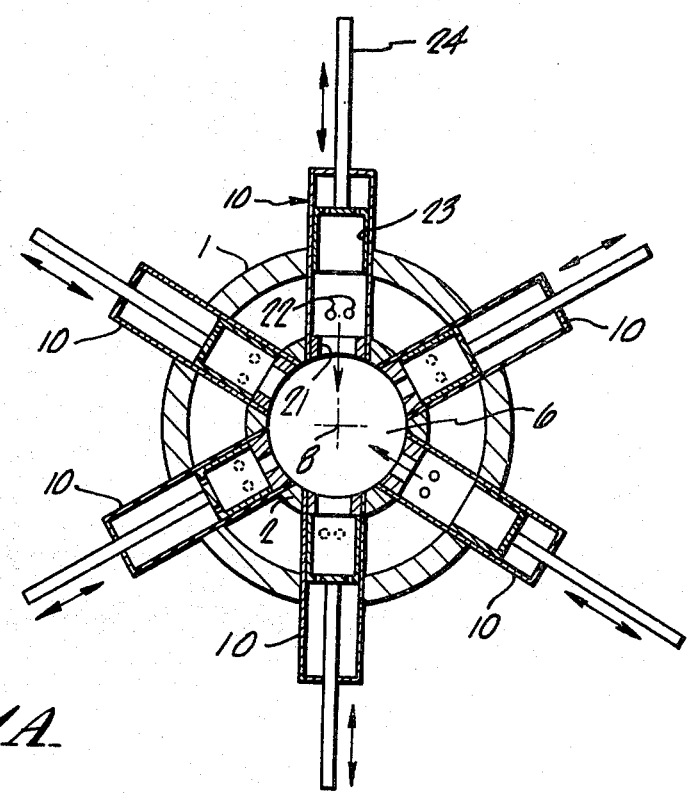
FIGS. 1A and 1B are a front elevation view in section and a side elevation view in section, respectively, of a fluid flow control system incorporating the principles of the invention.
Figure 1B:
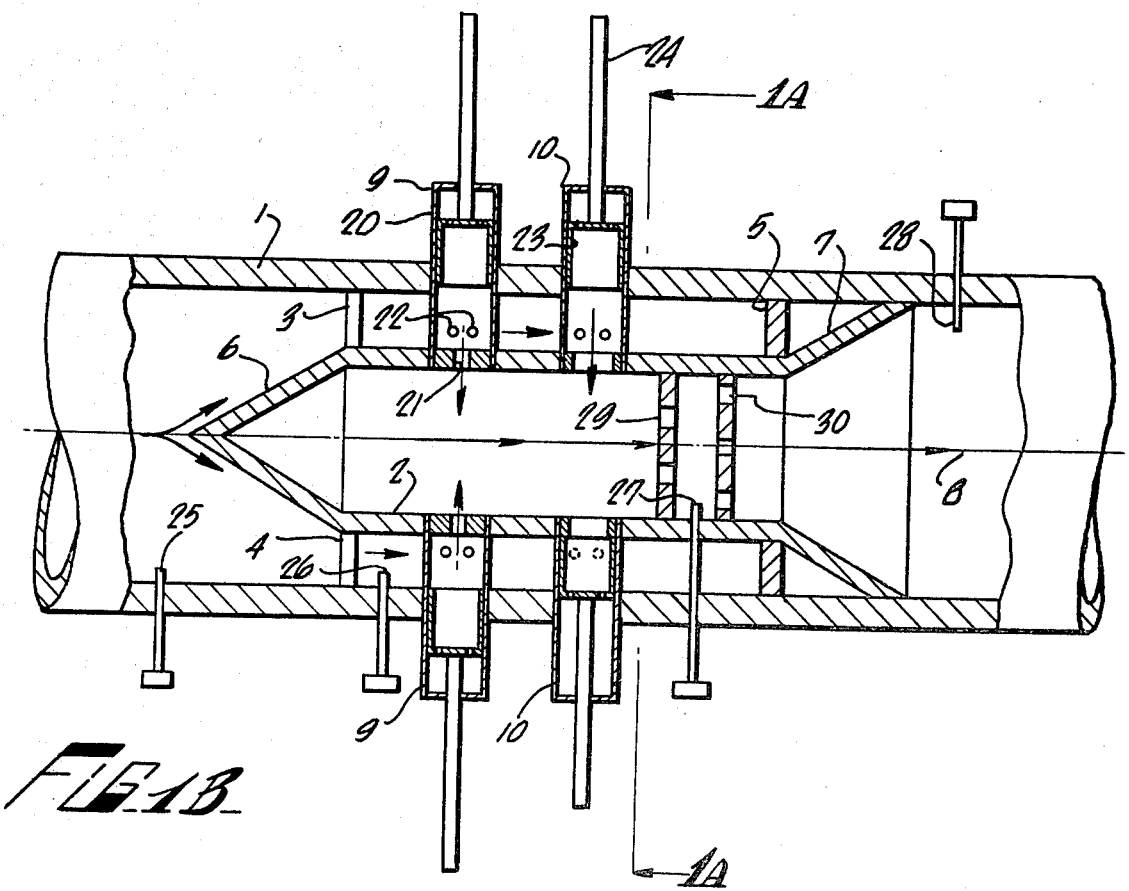

In FIGS. 1A and 1B, a fluid control system is shown which is constructed from standard pipes and plates. A section 1 of pipe is connected in series with the conduits of a fluid system whose flow rate is to be controlled. A section 2 of pipe having a smaller diameter than section 1 is attached to section 1 at one end by a plurality of fins distributed evenly about the perimeter of section 2 such as those designated 3 and 4. At the other end, section 2 is attached to section 1 by an annular terminating plate 5. Sections 1 and 2 are coaxially arranged about an axis 8. A flow directing cone 6 has a base with a diameter equal to that of section 2. The base of cone 6 is attached to the end of section 2 where the fins are located and the apex of cone 6 extends away from the end of section 2. A truncated cone 7 is connected between the end of section 2 where terminating plate 5 is located and section 1. The base of cone 7 extends away from the end of section 2. A plurality of individually actuatable digital valve elements 9 are disposed in a plane transverse to axis 8 for radial fluid flow from section 1 to section 2. A plurality of individually actuatable digital valve elements 10 are also disposed in a plane transverse to axis 8 for radial fluid flow from section 1 to section 2. As used in this specification, the term "digital valve element" is defined as a bistable valve element assuming only one of two states, that is, open or closed. Valve elements 10 are axially displaced from valve elements 9. Valve elements 9 are equidistantly spaced from axis 8 and valve elements 10 are equally spaced from axis 8. Further, as illustrated in FIG. 1A, valve elements 9 and valve elements 10 are each arranged radially all the way around axis 8 at approximately equal intervals.

The detailed construction of valve elements 9 and 10 is discussed below in connection with FIGS. 5A and 5B. Briefly, each valve element has a housing 20 that passes through aligned openings in sections 1 and 2. A flow determining orifice 21 is located within housing 20 at the opening in section 2. The portion of housing 20 located between sections 1 and 2 has a plurality of perforations 22 through it. A plug 23 is moved within housing 20 into one of two stable positions by a rod 24. In one position, plug 23 seals orifice 21 so the valve element is closed. In the other position, plug 23 is spaced from orifice 21 and the region of housing 20 in which perforations 22 are located. The actuating mechanisms for rod 24 are not shown in FIGS. 1A and 1B.

Transducers 25, 26, 27, and 28 sense the dynamic fluid conditions at various points in the fluid control system.

Fluid under pressure flows through the system generally along axis 8 in the direction indicated by the arrows in FIG. 1B. The interior walls of section 1, the exterior walls of cone 6, the exterior walls of section 2, and terminating plate 5 define an upstream chamber that is interconnected by valve elements 9 and 10 to a downstream chamber defined by the interior walls of cone 6, section 2, and cone 7. As the fluid enters the upstream chamber, the portion flowing in the vicinity of axis 8 is directed outwardly by cone 6. The fins are oriented to maintain the direction of fluid flow substantially parallel to axis 8 and prevent the formation of local disturbances as the fluid flows into the annular portion of the upstream chamber in which valve elements 9 and 10 are located. Valve elements 9 and 10 are selectively opened to control the rate of fluid flow from the upstream chamber to the downstream chamber. Termination plate 5 is spaced sufficiently far from valve elements 10 to permit approximately uniform fluid flow through all of perforations 22 in the open valve elements. Breaker plates 29 and 30 are transversely situated in section 2 between the valve elements and cone 7. The fluid passing through the open ones of valve elements 9 converges at one point on axis 8 and the fluid passing through the open ones of valve elements 10 converges at another point on axis 8. The vena contracta which would otherwise form in section 2 at high pressure and flow rates is dissipated by the collision of the fluid streams passing through the open valve elements. Breaker plates 29 and 30 stabilize the stream of fluid as it leaves the downstream chamber to flow through the remainder of the fluid system.

The areas of orifices 21 of the valve elements are weighted such that the smaller areas follow a geometric progression of two and the larger areas deviate from a geometric progression. Assuming, for example, that the areas of orifices 21 of the twelve valve elements shown in FIGS. 1A and 1B are weighted 1, 2, 4, 8, 16, 32, 32, 32, 32, 32, 32, and 32, the largest flow rate attributable to any one valve element is 12½ percent of the maximum flow rate through the fluid control system. Accordingly, less transient disturbance results from a change in state of valve elements and due to possible differences in their opening and closing times than results in a digital fluid control system in which all the orifice areas are weighted to follow a geometric progression of two. Further, the design of the valve elements is facilitated because no single valve element need accommodate one-half the maximum fluid flow rate.

Ideally, all the valve elements of a fluid control system constructed according to the principles of the invention would lie in the same plane transverse to the direction of fluid flow in equidistant relationship from a point lying on axis 8. In such case, the pressure drop across each valve element is the same, with the result that the rate of fluid flow through the various valve elements is not interdependent. The dissipation of the vena contracta and establishment of the same pressure drop across each valve element cause the effective orifice area of all the valve elements to be solely dependent upon the actual orifice area. This permits precise determination of the flow rate of a fluid flow control system through the design of the individual valve elements.

In practice, the diameter of the pipes of a fluid flow control system is sometimes too small to accommodate all the valve elements in a single plane. In such case, the valve elements are arranged in two planes as illustrated in FIG. 1B. The valve elements with the smaller orifice areas are arranged in the plane furthest upstream, i.e., valve elements 9 would have the smaller orifice areas. Thus, the effect of the states of valve element 9 on the fluid flow through valve elements 10 would be minimized and would, in most cases, be negligible.

Figure 2:
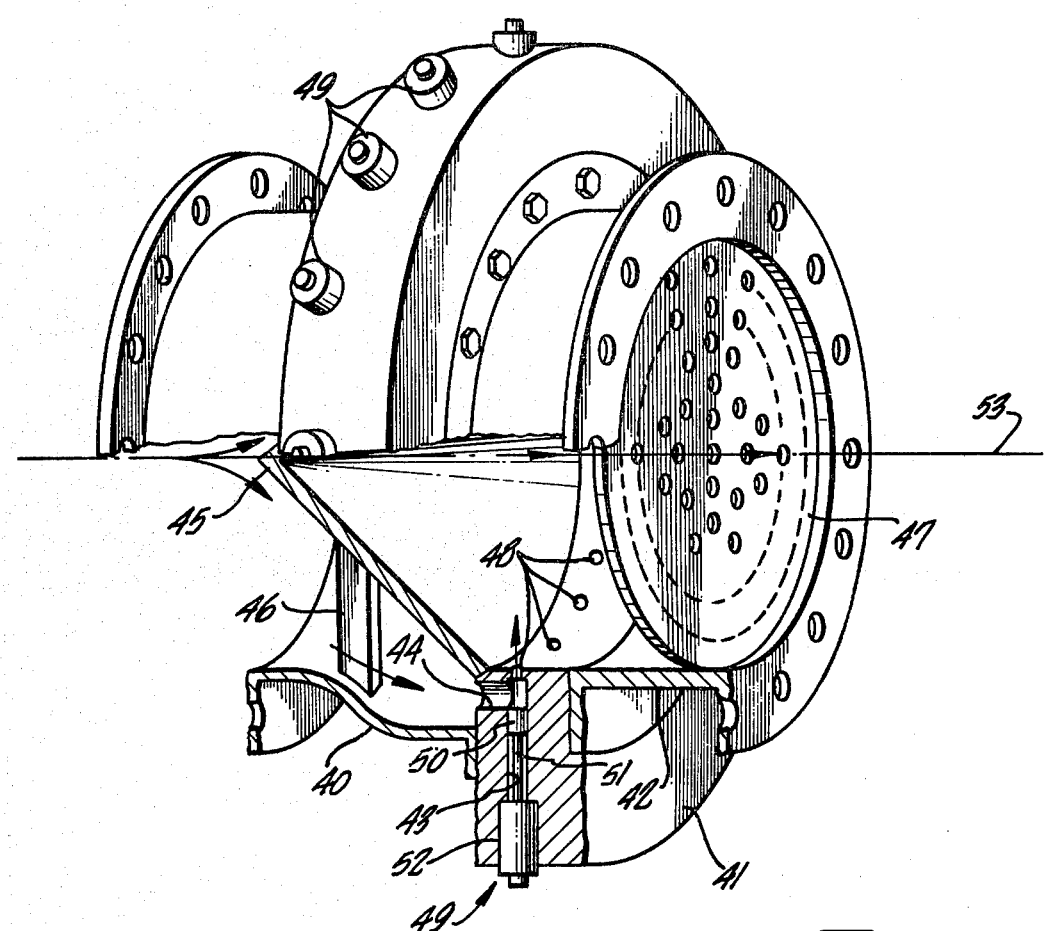
FIG. 2 is a perspective view partially in section of another embodiment of a fluid flow control system incorporating the principles of the invention.

In FIG. 2 an alternative embodiment of a fluid control system incorporating the principles of the invention is shown. A bell reducer 40 is connected to one side of an annular valve element block 41 and a pipe 42 is connected to the other side of block 41. Block 41 has a plurality of radial bores 43 and a like number of axial bores 44 that interconnect the interior of bell reducer 40 with radial bores 43. The base of a flow directing cone 45 is directly attached to block 41 and its apex extends away from block 41 along the interior of bell reducer 40. Fins such as that designated 46, which are distributed evenly between bell reducer 40 and cone 45, serve to support cone 45 and maintain the direction of fluid flow. A breaker plate 47 is mounted in pipe 42 to stabilize the fluid stream after passage through the valve elements. Each radial bore has a flow determining orifice 48 at the entrance to pipe 42 and contains digital valve element 49. Each of valve elements 49 comprises a plug 50 connected by a rod 51 to an actuator 52. Actuator 52 drives plug 50 into one of two stable positions. In one position, plug 50 seals orifice 48, and in the other position, plug 50 unblocks orifice 48. The direction of fluid flow is indicated by the arrows in FIG. 2. The interior wall of bell reducer 40 and the exterior wall of cone 45 define an upstream chamber while the interior wall of cone 45 and the interior wall of pipe 42 define a downstream chamber. As in the embodiment disclosed in FIGS. 1A and 1B, the valve elements are radially disposed in a plane perpendicular to the direction of fluid flow in the upstream and downstream chambers in equidistant relationship from an axis 53. Consequently, the pressure drops across valve elements 49 are equal. Valve elements 49 are also disposed to the fluid passing through them into the downstream chamber converges and dissipates the vena contracta.

In FIG. 3, a modified version of the fluid flow control system of FIG. 2 is shown. The same reference numerals are used to identify the corresponding parts in FIGS. 2 and 3. The modifications involved in the arrangement of FIG. 3 are as follows:

Bores 43 extend through block 41 at an acute angle to axis 53 instead of perpendicular thereto; flow determining orifices 48 are located at the exit of bell reducer 40 instead of the entrance to pipe 42; and bores 44 interconnect bores 43 with pipe 42. This arrangement provides a more compact package than the arrangement of FIG. 2 because the length dimension of valve elements 49 are disposed in a position that has an axial component as well as a radial component. It does not, however, produce as effective a dissipation of the vena contracta as the arrangements of FIGS. 1A and 1B and FIG. 2 because the convergence of the fluid streams from the valve of elements has an axial component instead of being purely radial.

Figure 4:
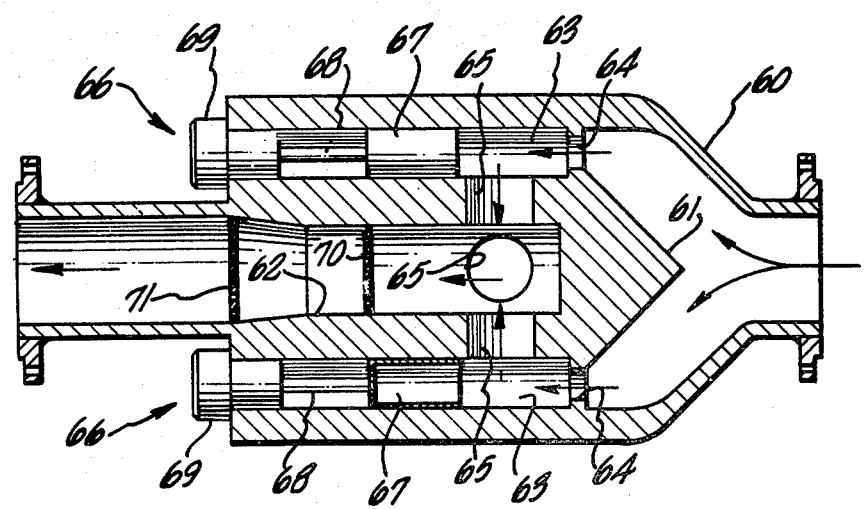
FIG. 4 is a side elevation view in section of another embodiment of a fluid control system incorporating the principles of the invention.
Figure 2:
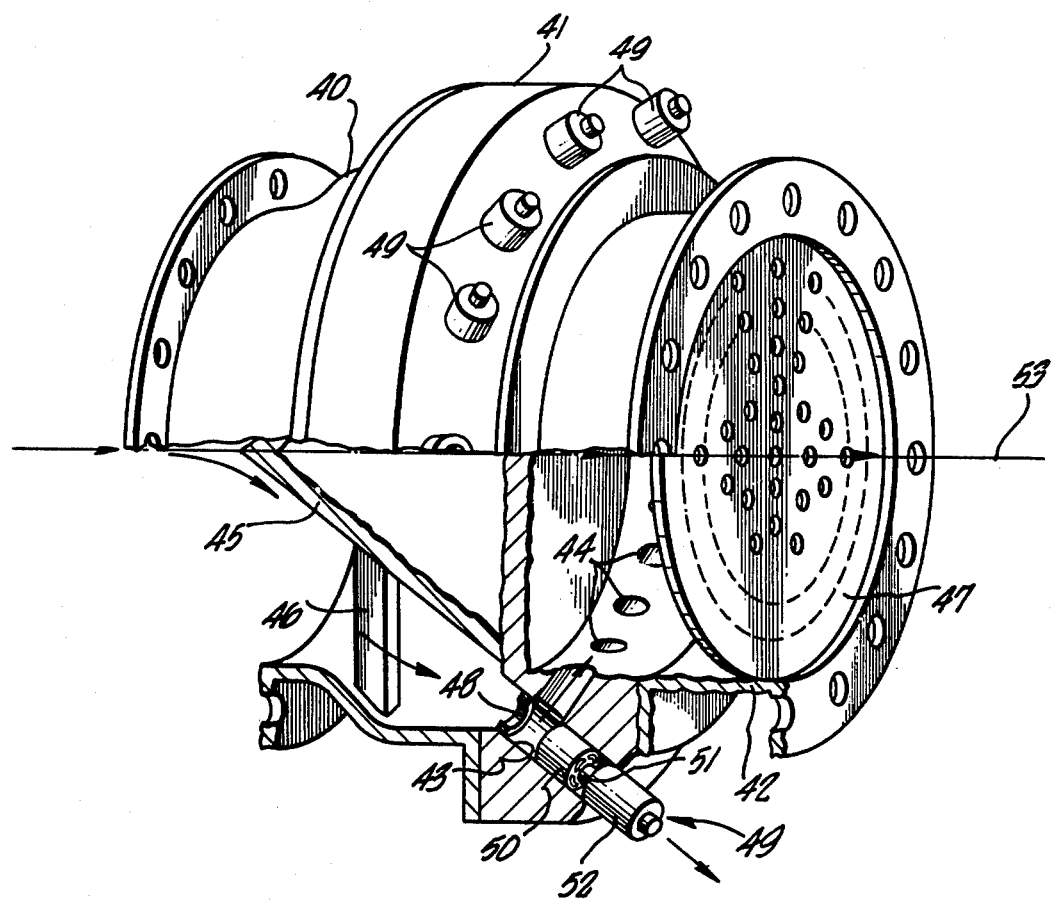

In FIG. 4, an arrangement is shown that carries the modification of the arrangement of FIG. 3 to its limit. An upstream chamber is defined by the interior wall of a housing 60 and the exterior wall of a flow directing cone 61. The walls of an axial bore 62 define a downstream chamber. A plurality of axial bores 63 are formed in housing 60 around bore 62. Each of bores 63 has a flow determining orifice 64 at the exit of the upstream chamber. Radial bores 65 interconnect bores 63 with the downstream chamber. Valve elements 66 are contained within bores 63. Each valve element has a plug 67 connected by a rod 68 to an actuator 69. Actuator 69 drives plug 67 into one of two stable positions. In one position, plug 67 seals orifice 64, and in the other position, plug 67 unblocks orifice 64. Breaker plates 70 and 71 are situated in the downstream chamber. This arrangement of parts permits a compact package without sacrificing efficiency in the dissipation of the vena contracta as in the arrangement of FIG. 3.

Figure 5A:
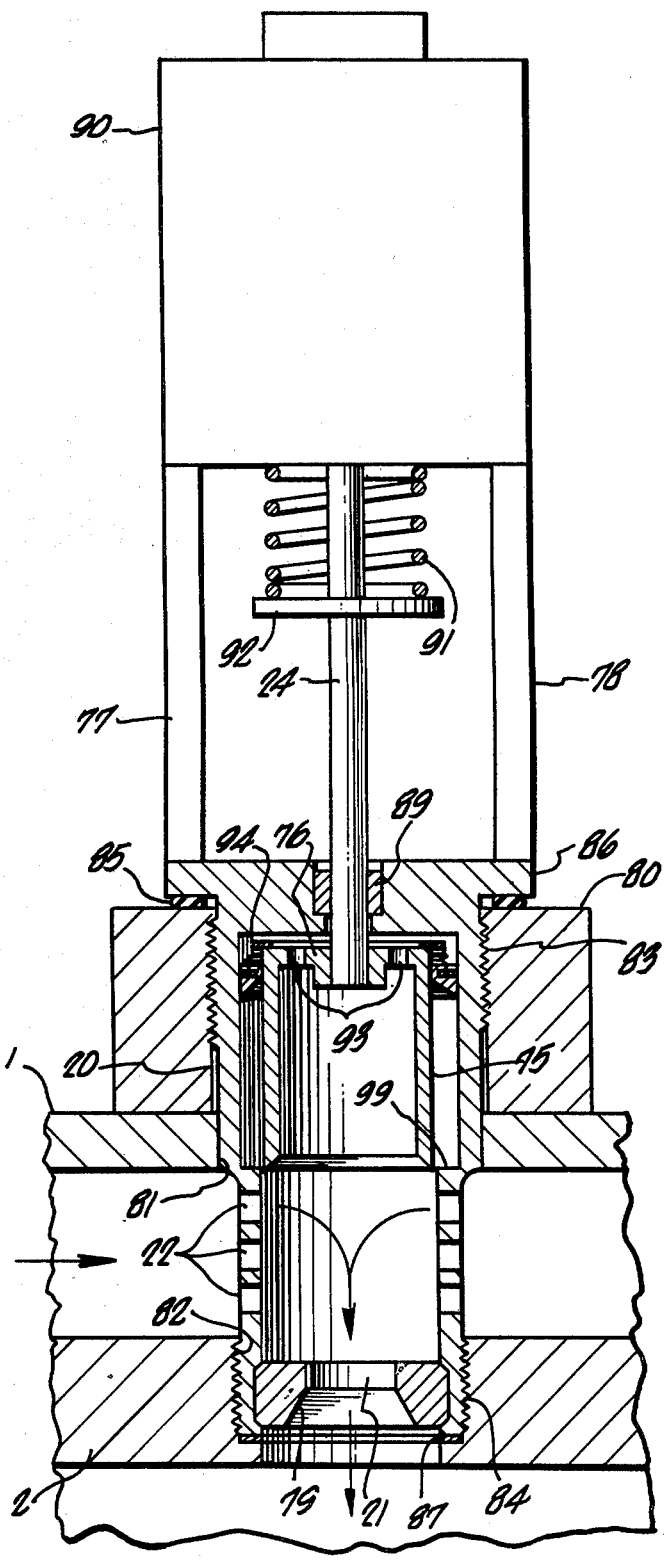
FIGS. 5A and 5B are a side elevation view in section and a partial enlargement, respectively, of one of the valve elements employed in the fluid control system of FIG. 1.
Figure 5B:
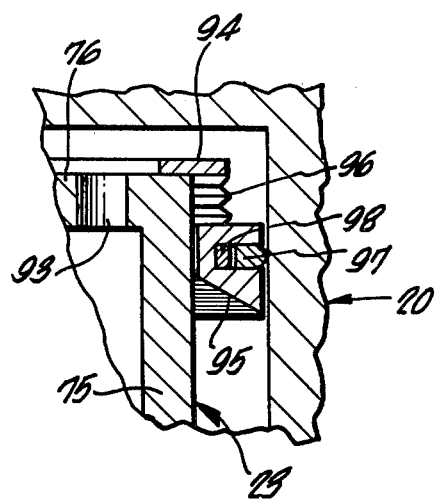

In FIGS. 5A and 5B, one of the valve elements of the fluid flow control system of FIGS. 1A and 1B is shown in detail. With several minor modifications, this same valve element could also be used to advantage with the arrangements of FIGS. 2, 3, and 4. The same reference numerals are employed in FIGS. 5A and 5B and in FIGS. 1A and 1B to identify corresponding parts. A weld pad 80 (not depicted in FIGS. 1A and 1B) is attached to the outside surface of section 1 where the valve element is located. A radial bore 81 is formed in weld pad 80 in section 1 and a radial bore 82 is formed in section 2. Bores 81 and 82 are in axial alignment. Portions of the interior surfaces of bores 81 and 82 are threaded and corresponding portions of the exterior surface of valve housing 20 are threaded. The threaded connections between housing 20 and bores 81 and 82 are designated at 83 and 84, respectively. To remove the valve element, housing 20 need only be unscrewed. An O-ring 85, which is compressed between a flange 86 and the surface of weld pad 80, and an O-ring 87, which is compressed between a flange at the end of bore 82 and the end surface of housing 20, provide fluid-tight seals between the exterior of housing 20 and bores 81 and 82. Housing 20 has a cylindrical channel through it. A flow orifice block 79 is fitted into a recess in the interior wall of housing 20 at the exit of the valve element. Block 79 has a precisely determined opening through it which comprises orifice 21. Plug 23 is a hollow cylinder 75 with a cover 76 at one end to which rod 24 is attached. Rod 24 extends through a fluid-tight gasket 89 at the end of housing 20 to a conventional solenoid valve actuator 90 attached to housing 20 by supports 77 and 78. A compression spring 91 is fixed at one end to actuator 90 and at the other end to a spring keeper 92. Thus, when actuator 90 is unenergized, spring 91 urges plug 23 upward into the position shown in FIG. 5A. When plug 23 is in this position, the valve element is open. Thus, fluid flows from the annular region between sections 1 and 2 through perforations 22 into the interior of housing 20 and then through orifice 21 into section 2, as depicted by the arrows in FIG. 5A. While the valve element is in its open state, the portion of the channel through housing 20 surrounded by perforations 22 is in the dynamic fluid region of the system. The remainder of the channel through housing 20 is in the static fluid region. Plug 23 lies completely outside of the fluid stream in this static fluid region when the valve element is open. Therefore, variations in the position of plug 23 in the open state that develop in the course of prolonged use do not affect the flow rate through the open valve element.

Cover 76 has perforations 93 through it to balance the pressure on both sides of plug 23. An annular plate 94 is fixed to cover 76. A sealing ring 95 that surrounds plug 23 is attached to plate 94 by a contractible, fluid-tight metallic bellows 96. Bellows 96 functions as a tension spring along the axis of cylinder 75. A ring guide 97 made of a low-friction material such as Teflon is embedded in an annular groove in sealing ring 95 with a back-up spring 98. Spring 98 urges ring guide 97 radially outward into contact with the interior walls of housing 20, thereby centering plug 23 as it moves within housing 20. When actuator 90 is energized to close the valve element, plug 23 is driven downward until the bottom end surface of cylinder 75 is seated on the top surface of orifice block 21 to form a seal. In this plug position, sealing ring 95 is seated on a stepped surface 99 in the interior of housing 20 to form another seal. Surface 99, which is perpendicular to the axis of cylinder 75, is disposed between the dynamic and static regions in the channel. The length of bellows 96 is selected so it is somewhat compressed when sealing ring 95 is seated on surface 99. Consequently, the restoring force exerted by bellows 96 on sealing ring 95 establishes a good, fluid-tight seal between surface 99 and sealing ring 95. As the parts of the valve element wear in the course of prolonged use, the position of sealing ring 95 is adjusted by bellows 96 to maintain a fluid-tight seal with surface 99 in the closed state of the valve element. When the valve element is closed, the fluid in the downstream chamber passes through perforations 93 to balance the pressure on both sides of plug 23. The seal between ring 95 and surface 99 prevents leakage however from the upstream chamber through perforations 22 and perforations 93 to the downstream chamber and bellows 96 provides an elastic, fluid-tight connection between ring 95 and annular plate 94 of plug 23.

In FIG. 6, a block diagram of an automatic control system is shown for the digital valve arrangement described above. A binary computer 110 produces digital signals that are coupled by line drivers 111 to the actuators of the elements of a digital valve 112. As the elements of valve 112 are opened and closed responsive to the respective binary signals, the dynamic fluid conditions represented by block 113 vary. A sensor 114 detects the change in the dynamic fluid conditions. The output of sensor 114 is converted to a digital signal by an analog-to-digital converter 115 and applied to digital computer 110. In digital computer 110, the actual dynamic fluid conditions sensed are compared with the desired conditions stored therein and calculations are made to generate binary signals for valve 112 so the actual dynamic fluid conditions approach the desired conditions. If the larger orifice areas of the elements of valve 112 deviate from a geometric progression as discussed above, the binary signals generated by digital computer 110 would have to be modified prior to application to line drivers 111.

In FIG. 7, a block diagram of another system is shown for automatically controlling the digital valve arrangements described above. A command voltage is applied to one input of a difference amplifier 120. An integrating operational amplifier 121 couples difference amplifier 120 to an analog-to-digital converter 122. An encoder 123 couples analog-to-digital converter 122 to a bank of flip-flops 124. Line drivers 125 connect the outputs of flip-flops 124 to the elements of a digital valve 126. As the elements of valve 126 open and close, the dynamic fluid conditions represented by block 127 change. The conditions are detected by a sensor 128 that produces an analog signal representative thereof at its output. The output of sensor 128 is coupled through an amplifier 129 to the other input of difference amplifier 120. Therefore, the output of difference amplifier 120 is the difference between the actual and desired dynamic fluid conditions, i.e., the error signal. This error signal is integrated by operational amplifier 121. Valve 126 is automatically adjusted to reduce the integrated error signal.

The term "orifice" is used in this specification in connection with the valve elements also includes a cavitation-venturi, in which the plug blocks and unblocks the valve elements at the venturi. In such case, the valve elements are designed so the static pressure of the fluid at the venturi is the vapor pressure of the fluid plus system back pressure. Thus, the pressure drop across each valve element is the same, namely the upstream pressure minus the vapor pressure, plus system back pressure.

What is claimed is:
1. An automatic fluid flow control system comprising:
    an upstream conduit;
    a downstream conduit;
    a plurality of individually actuatable digital valve elements interconnecting the upstream conduit and the downstream conduit, each valve element having a flow determining orifice, a plug, and means responsive to a binary signal for controlling the movement of the plug so it assumes one of only two stable positions corresponding to the values of the binary signal, the plug closing the orifice in the one stable position and lying outside the fluid stream in the other stable position;
    means for generating a signal representative of the dynamic fluid conditions of the system;
    means for producing a plurality of binary signals for application to the valve elements, the binary signals representing the valve states required to make the dynamic fluid conditions satisfy a predetermined criterion;

means for coupling to the binary signal producing means the signal representative of the dynamic fluid conditions; and means for coupling the binary signals to the respective valve elements to place their plugs in the positions corresponding to the values of the binary signals.

* * * * *